(12) United States Patent
Moroney

(10) Patent No.: US 6,741,753 B1
(45) Date of Patent: May 25, 2004

(54) METHOD AND SYSTEM OF LOCAL COLOR CORRECTION USING BACKGROUND LIMINANCE MASKING

(75) Inventor: Nathan M. Moroney, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 605 days.

(21) Appl. No.: 09/655,193

(22) Filed: Sep. 5, 2000

(51) Int. Cl.[7] .................................................. G06K 9/40
(52) U.S. Cl. ........................ 382/274; 382/167; 382/260; 382/264
(58) Field of Search ................................. 382/162, 167, 382/260, 264, 265, 274; 358/518, 520; 345/604

(56) References Cited

U.S. PATENT DOCUMENTS

| | | | | |
|---|---|---|---|---|
| 5,224,178 A | * | 6/1993 | Madden et al. | 382/167 |
| 5,497,431 A | * | 3/1996 | Nakamura | 382/162 |
| 5,838,299 A | * | 11/1998 | Smith et al. | 382/279 |
| 6,404,918 B1 | * | 6/2002 | Hel-or et al. | 382/167 |
| 6,453,074 B1 | * | 9/2002 | Zheng | 382/162 |
| 6,459,436 B1 | * | 10/2002 | Kumada et al. | 345/590 |

OTHER PUBLICATIONS

Kim et al. "Applying CIECAM97s in colour management system". TENCON 99. Proceedings of the IEEE Region 10 Conferenc vol.: 2, Sep. 15–17, 1999, Page(s): 1367–1370.*
Burt et al. "The Laplacian Pyramid as a Compact Image Code". Communications, IEEE Transactions on, vol.: 31 Issue: 4, Apr. 1983, Page(s): 532–540.*

* cited by examiner

Primary Examiner—Amelia M. Au
Assistant Examiner—Colin LaRose

(57) ABSTRACT

A color correction apparatus and method in which a mask is derived from image data in a first pixel representation and is used to convert the image data into a perceptual color space representation which is a function of a background luminance parameter. The mask corresponds to a blurred monochrome version of the original image and includes a set of averaged greyscale values having a pixel-by-pixel correspondence with the original image. The values within the mask vary dependent on the location of the corresponding pixel within the image data. When converting the image data pixel-by-pixel into the perceptual color space representation, localized color correction is obtained by using varying mask values as the background luminance parameter for each pixel conversion.

16 Claims, 5 Drawing Sheets

METHOD AND SYSTEM OF LOCAL COLOR CORRECTION USING BACKGROUND LUMINANCE MASKING

FIELD OF THE INVENTION

The present invention relates to digital image color correction and in particular to a localized background color correction based on varying image background luminance.

BACKGROUND OF THE INVENTION

Images that are captured by an image detection device such as a digital camera are often different than the actual image perceived by the device user. The discrepancy between the perceived and detected image are due to many factors such as the characteristics and settings of the image detection device, ambient lighting conditions, and the difference between the human visual perception model and the image detection device perception model, to name a few. One problem that is seen when detecting images is due to the uneven illumination of the image. In this case, when the image detection device detects an unevenly illuminated image, the resulting detected image will often have portions that are too light/dark such that image quality is greatly reduced.

One prior art solution for evening out image illumination is by manual adjustment of image parameters. For instance, the techniques known as dodging and burning require a user to physically specify or identify regions of the image to be lightened or darkened. Dodging and burning consists of cutting and positioning physical masks during the photographic development process. These techniques can also be carried out digitally using a mouse or other computer interface to select specific pixels or regions in an image to be lightened or darkened. In addition to manually identifying regions for adjustment, the user must also control the amount of adjustment. The problem with this technique is that it requires a certain level of skill and a large amount of time and effort to achieve. Another solution is based on Retinex or edge-ratio preserving algorithms. These algorithms use an iterative processing of an image in order to determine a corrected output image. This iterative process consists of taking ratios of a number of neighboring pixel values, multiplying these ratios and finally, resetting these ratios if some maximum value is achieved. In this way image edge lightness values are better reproduced and, given a large enough number of ratios, these lightness values should be normalized relative to the image white. The assumption is that this sequence of calculations mimics the human visual system. Specifically, an observer is constantly scanning an image or scene and is performing some type of normalization relative to the scene or image white. The algorithms attempt to model the human visual system and reconstruct a digitally captured image with perceptually correct local color correction from a given scene. Given a calibrated input, this approach generates images that are similar to those that might be produced using the manual technique, where a calibrated input is an image that accurately represents some physical quantity that can be directly measured, such as radiance or luminance. However, current implementations tend to be computationally intensive. In addition, there is no simple framework to allow an interactive or user specified control over these algorithms that is important for either correcting uncalibrated inputs images or for correcting under, over and unevenly exposed images. Other approaches include histogram equalization, image segmentation, or specialized hardware. Histogram equalization techniques use properties of the statistical distribution of the lightness values in the image to derive a tone correction curve for that image. Image segmentation techniques attempt to automatically partition images into regions. These regions are then lightened or darkened based on an analysis of these regions. Hardware such as logarithmic CCD sensors and dual sampling CMOS sensors provide a better means of capturing high dynamic range scene data. However, this hardware does not specify how this high dynamic range data should be processed or mapped to a lower dynamic range devices.

In order to "correct" images when they are captured by the detection device the images are initially converted into a digital data format to allow for image enhancement and processing. The digital data format is represented by an array of picture elements (i.e., pixels) where each pixel has associated digital information describing the image at that pixel location within the array. The digital data of the image can be represented in different types of color space representations. One type of color space representation, referred to as a perceptual color space (or color space model) representation, defines pixels by perceptual parameters of the image. The color space model is defined as a viewing specific transformation of the XYZ representation to/from a perceptual attributes representation. For instance, in the case of CIELAB each color component is defined by three attributes lightness (L*), chroma and hue. The coordinates a* and b* are the Cartesian coordinates that can be computed from lightness, chroma and hue using standard polar to Cartesian coordinate transformations. The a* and b* axes correspond to the red-green and yellow-blue opponent color axes. Another state of the art perceptual color space or color appearance model that has been recently developed referred to as CIECAM97s defines color components by three attributes including lightness (J), chroma (C) and hue (H).

FIG. 1 shows a flow chart of the steps performed when converting image pixel data (i.e., Sample XYZ and White Point XYZ) into the CIECAM97s color space representation. As can be seen, one of the parameters that the lightness, chroma and hue attributes are a function of is the background luminance, $Y_b$, where the background is defined as the region of a scene or image that subtends roughly 12 to 14 degrees, centered on an image stimulus or target. Typically, the $Y_b$ parameter has been set to 20 during image conversion and has implicitly incorporated a gray world assumption. Both of the lightness and chroma of an image are a function of background luminance.

What would be desirable would be to use the background luminance parameter of a perceptual color space to adjust uneven illumination of a digital image.

SUMMARY OF THE INVENTION

A color correction apparatus and method in which a mask is derived from image data in a first pixel representation and is used to convert the image data into a second color space representation which is a function of a background luminance parameter. The mask comprises a set of digital values having a pixel-by-pixel correspondence with the original image. The values within the mask vary dependent on the location of the corresponding pixel within the image data. When converting the image data pixel-by-pixel into the second color space representation, localized background color correction is obtained by using the varying mask values as the background luminance parameter for each pixel conversion.

In accordance with one embodiment of the apparatus and method of color correction, a mask is derived by decimating the image data to generate a condensed version of the pixel data, filtering the condensed version of the pixel data by averaging each pixel value of the condensed version with surrounding pixel values and replacing each pixel value with the averaged value of the surrounding pixel values; expanding the filtered condensed version such that there is one-to-one correspondence between pixel values in the expanded version and pixel values in the original image; scaling pixel values in the expanded version into a greyscale representation to obtain the mask.

In accordance with an alternative embodiment of the apparatus and method of color correction, the mask is derived by processing each pixel value in the original image to derive a corresponding mask value 1) by determining the average of pixel values surrounding each pixel value and replacing each pixel value with the average 2) scaling the averaged values into a greyscale to obtain the corresponding mask value.

In accordance with another embodiment of the apparatus and method of color correction the averaged values are weighted according to a Gaussian function.

In an alternative embodiment of the apparatus and method of color correction the color corrected second color space representation of the image is inversely converted back into the first color space representation using a fixed background luminance parameter.

In still another embodiment, the color corrected first color space representation is reiteratively color corrected by deriving a new mask and re-converting back into the second color space representation using the new mask.

BRIEF DESCRIPTION OF THE DRAWINGS

The objects, features, and advantages of the present invention will be apparent to one skilled in the art, in view of the following detailed description in which.

DETAILED DESCRIPTION OF THE INVENTION

Figure 2:
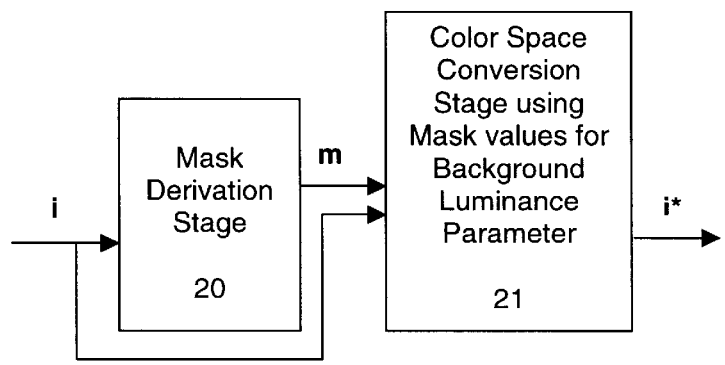
FIG. 2 illustrates a first embodiment of the apparatus of color correction using background luminance masking in accordance with the present invention.

A method and apparatus of color correction that provides a variable pixel-by-adjustment of background luminance of a digital image thereby allowing local adjustment/correction of image illumination is described. FIG. 2 shows a first embodiment of an apparatus of color correction which includes a mask derivation stage 20 which derives a mask from digital image data i to generate a mask m. In one embodiment, the mask comprises an array of mask values having a one-to-one correspondence to the array of pixel values representing the digital image data i. The mask m and image i are provided to the color space conversion stage 21 where the color space conversion stage 21 uses the mask values for the background luminance parameter to convert the image pixel-by-pixel to generate a color corrected color space representation i* of the image. As a result, background luminance is adjusted on a pixel-by-pixel basis. In one embodiment, the color space representation is a perceptual color space representation. In another embodiment, the color space representation is one of the CIECAM97s or CAM97s2 perceptual color space representations or any color appearance model with a luminance background parameter. It should be noted that stages 20 and 21 can be implemented in a digital signal processing implementation, hardware implementation, or a combination of digital signal processing and hardware implementations. It should further be noted that the CAM97s2 color appearance model is a revision of CIECAM97s and either model can be used to perform the proposed local color correction. For the purpose of background masking, CIECAM97s, CAM97s2 or any color appearance model with a background luminance parameter can be used as the color representation. In one embodiment, the digital image data is in an XYZ tristimulus color space representation.

Figure 3:
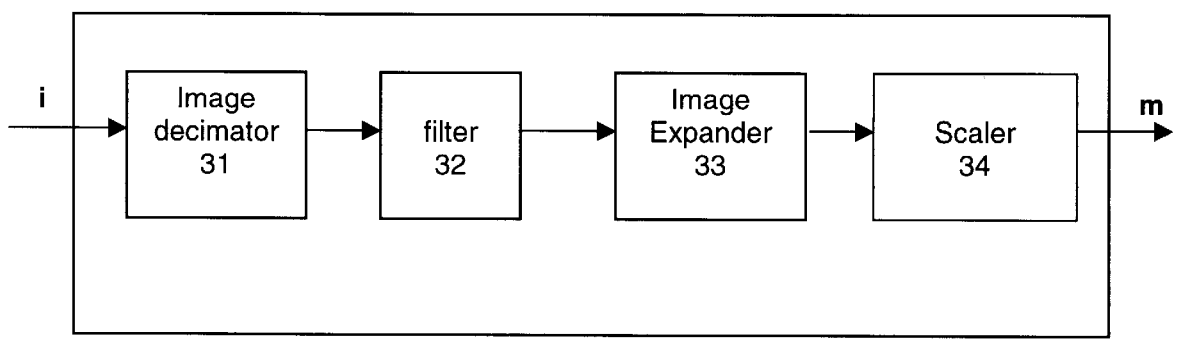
FIG. 3 illustrates a first embodiment of the apparatus of deriving the mask for use in the apparatus of color correction shown in FIG. 2.

FIG. 3 shows a first embodiment of the mask derivation stage 20 including an image decimator 31 which receives the image i, and generates a condensed version of the image data. In particular, image decimator 31 reduces the number of pixels values of the original image. One reason for decimating image data is to reduce mask processing time. In one embodiment pixel values are reduced by keeping only every nth pixel value in both of the horizontal and vertical directions such that the condensed image data is 1/nth the original image data. The condensed image data is passed to filter 32 which filters the condensed image data by averaging. In one embodiment, for each pixel value, an average value is obtained for the surrounding pixel values. The average value is then substituted for the original image value. The filtered image is then restored to the original number of image values by image expander 33. In one embodiment, image expansion is performed by repeating pixel values in the condensed image version and in another embodiment the expansion is performed by interpolating pixel values in the condensed version to generate new pixel values between condensed pixel values. The expanded image is then scaled using scaler 34 from the original pixel value scale to a greyscale. In one embodiment, the original pixel value is scaled from 0–256 and the greyscale is scaled from 0–100.

In one embodiment the resulting mask has a corresponding set of mask values with a one-to-one correspondence to the original image pixels and is a "blurred" monochrome version of the original image. In another embodiment of the apparatus, the filter 32 can be implemented with a large kernal averaging filter. In another embodiment, the filter 32 can be implemented with a weighted averaging function filter. It should be noted that image decimator 31, filter 32, image expander 33, and scaler 34 can be implemented in a digital signal processing implementation, hardware implementation, or a combination of digital signal processing and hardware implementations.

Figure 4:
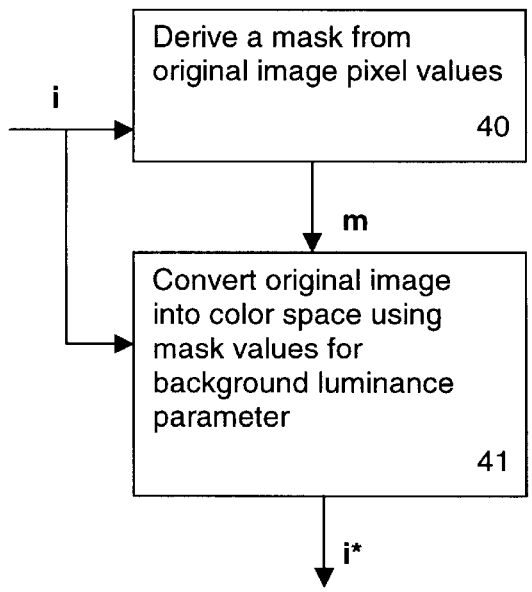
FIG. 4 illustrates a first embodiment of the method of color correction using background luminance masking in accordance with the present invention.

FIG. 4 shows a first embodiment of the method of color correction including the steps of deriving a mask m (step 40)

from a pixel representation of an image i and converting the pixel representation i into a color space representation i* using mask values for the background luminance (step 41).

Figure 5A:
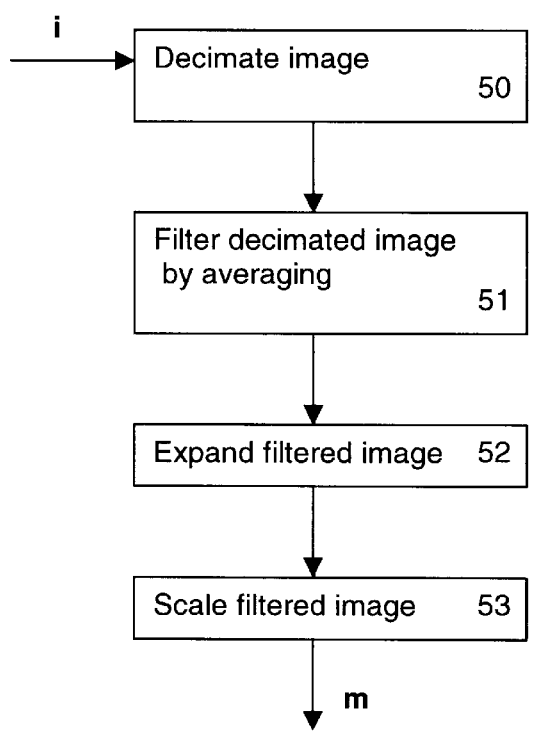
FIG. 5A illustrates a first embodiment of a method of deriving a mask for use in the method shown in FIG. 4.

FIG. 5A shows one embodiment of the method of deriving the mask m from the image i including the steps of decimating the image (step 50) to generate a condensed version of the image. The decimated image is then filtered by averaging each value with values surrounding it (step 51). The filtered image is then expanded so as to increase the number of values of the mask (step 52). In one embodiment, the expanded image has the same number of values as the number of pixels in the original image. The expanded image is then scaled (step 53). In another embodiment, the resulting mask is a blurred, monochrome version of the original image. One advantage of this embodiment is that by decimating the original image, less data processing is performed to generate the mask.

Figure 5B:
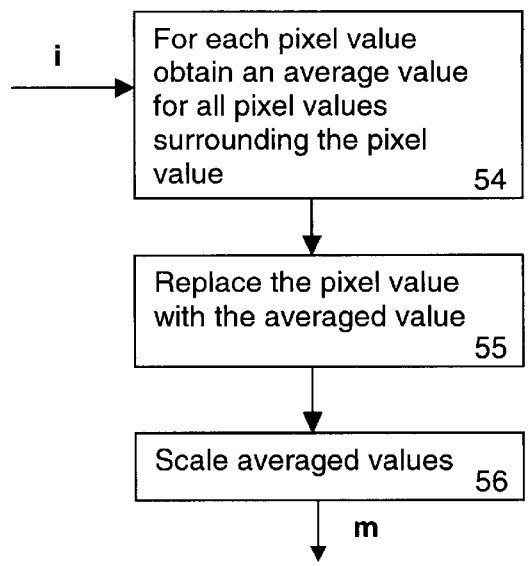
FIG. 5B illustrates a second embodiment of the method of deriving a mask for use in the method shown in FIG. 4.

FIG. 5B shows another embodiment of the method of deriving the mask m from the image i where the steps of decimating and expanding are not performed. In this embodiment, each pixel in the original image data representation i is averaged and then filtered to generate the mask. As shown, this method includes the steps of obtaining a mask value from each pixel value by determining an average value for all pixel values surrounding each pixel value (step 54) and replacing that average value for the pixel value (step 55). The mask created from the average values is then scaled.

Figure 6:
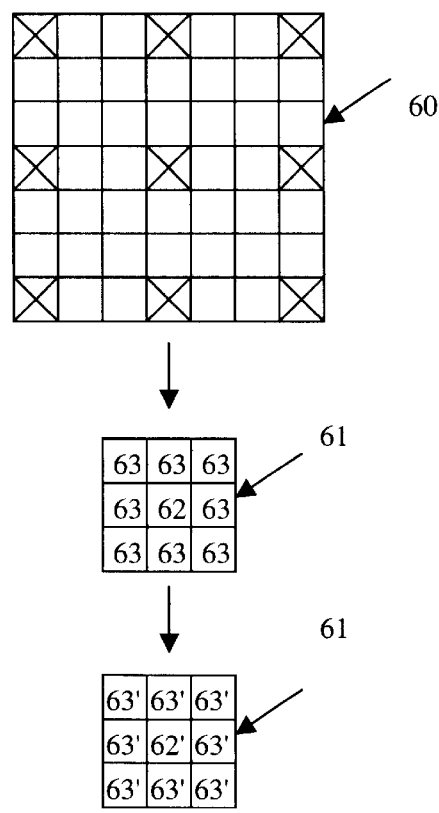
FIG. 6 illustrates an example of processing pixel values of the image i to derive mask values.

An example of processing the pixel values of the image i to generate the mask is illustrated in FIG. 6. Initially the image data is decimated by selecting every nth pixel value from the image data and the remainder of the pixel values are discarded 60. In this example, every fourth pixel is selected where selected pixel values are indicated with an "x". The result of the decimation is a condensed version 61 of the image. The selected pixels are then individually filtered to determine a corresponding average value. The average is determined using adjacent pixel values. In this example, pixel 62 is filtered by obtaining the average of adjacent pixel values 63. The resulting averaged value 62' is the mask value at that location. The remainder of the mask values 63' are determined in the same manner. This condensed version of the mask values is then expanded to obtain mask m (not shown).

It should be understood that mask value 62' can also be determined by using a weighted average function. In this case, the averaged value is determined by using both adjacent and non-adjacent pixel values. For instance, pixels are weighted in a diminishing manner dependent on their location (i.e., distance from) the pixel being filtered. In one embodiment, a Gaussian function is used as the weighting function.

Figure 7:
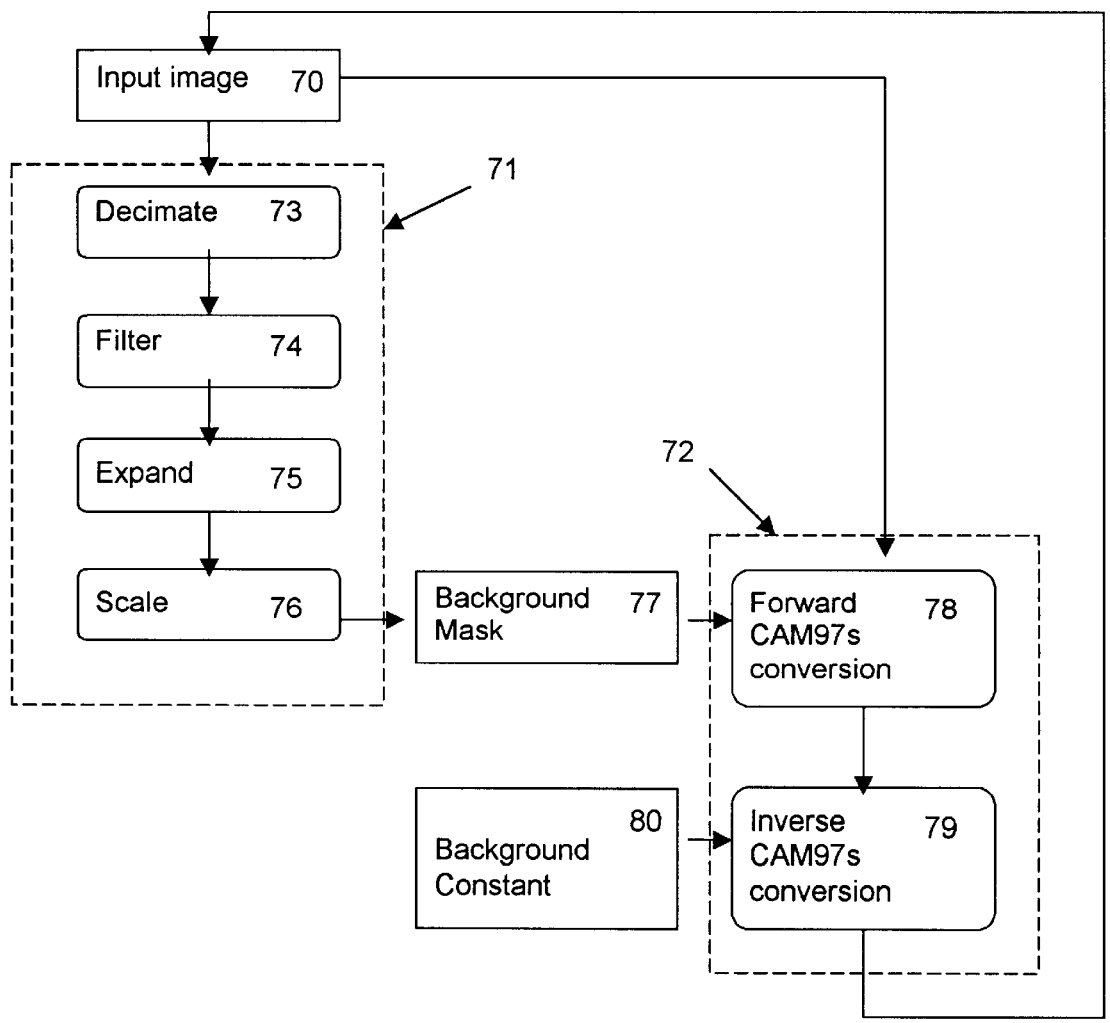
FIG. 7 illustrates an embodiment of a method of reiterative background masking in accordance with the present invention.

FIG. 7 shows another embodiment of the method of color correction by adjusting background luminance $Y_b$ in a CAM97s2 perceptual color space representation that allows for reiterative color correction. In this embodiment, the background mask is derived from the input image tristimulus XYZ color space representation. The input image 70 is applied to a mask derivation path 71 and a color conversion path 72. In the mask derivation path, the image is decimated 73, filtered 74, expanded 75, and converted to greyscale 76 to generate background mask 77. The background mask 77 is applied during Forward CAM97s2 color conversion 78 to convert input image 70 into a CAM97s2 perceptual color space representation. Specifically, each mask value is substituted for the background luminance value $Y_b$ in the Eq. 1 below for determining the lightness parameter J of the CAM97s2 color space representation of the image:

$$J_{out} = 100 \cdot \left(\frac{J_{in}}{100}\right)^{f(Y_b)} \qquad \text{Eq. 1}$$

After Forward CAM97s2 conversion, an inverse CAM97s2 conversion 79 is performed to convert the CAM97s2 representation back to the original color space representation of input image 70. This inverse conversion 79 utilizes a constant background parameter 80 instead of a background mask 77. This constant background parameter defaults to 20 although other values could be used depending on the overall lightness properties of the image. In this way the color correction method can be performed reiteratively to obtain the desired image quality. In an alternative embodiment, the reiterative process can be avoided or minimized by scaling the range of possible exponents in Equation 1 in order to achieve a greater or lesser degree of local color correction.

In an alternative embodiment, instead of inversely converting back to the original color space representation, the image is converted to a device color space representation for providing the color corrected image to an output device such as a printer or monitor.

In an additional simplified embodiment, a single mean image value is determined for all pixel values instead of pixel-by-pixel mask values. The means value is determined by deriving the mask using the image data as described in previous embodiments and then determining the mean of all of the mask values. Hence, in this case the single mean value (i.e., the mean image luminance) is substituted for the background mask 77 during the forward color appearance model computations 78 in FIG. 7. This embodiment provides a method of performing image specific corrections using the background parameter and would be appropriate in situations in which processing limitations preclude the derivation and application of a background mask.

In another embodiment, instead of color correcting the entire image, color correction can be performed on a target area/stimuli within the image. In this case, a mask can be generated that encompasses the target stimuli and the background of the target stimuli where the background is defined as the region of a scene or image that subtends roughly 12 to 14 degrees, centered on an image stimulus or target. Hence in this embodiment, the area to be color corrected is determined by first selecting a target area and then determining the area within the image that encompasses the background of the target area. This area defines where color correction of the background is to be performed. Once the color correction area is determined a mask can be derived as described herein for that area using the pixel values in the original image within that designated color correction area. Hence, in this embodiment, background color correction is performed on portions of the image.

Figure 1:
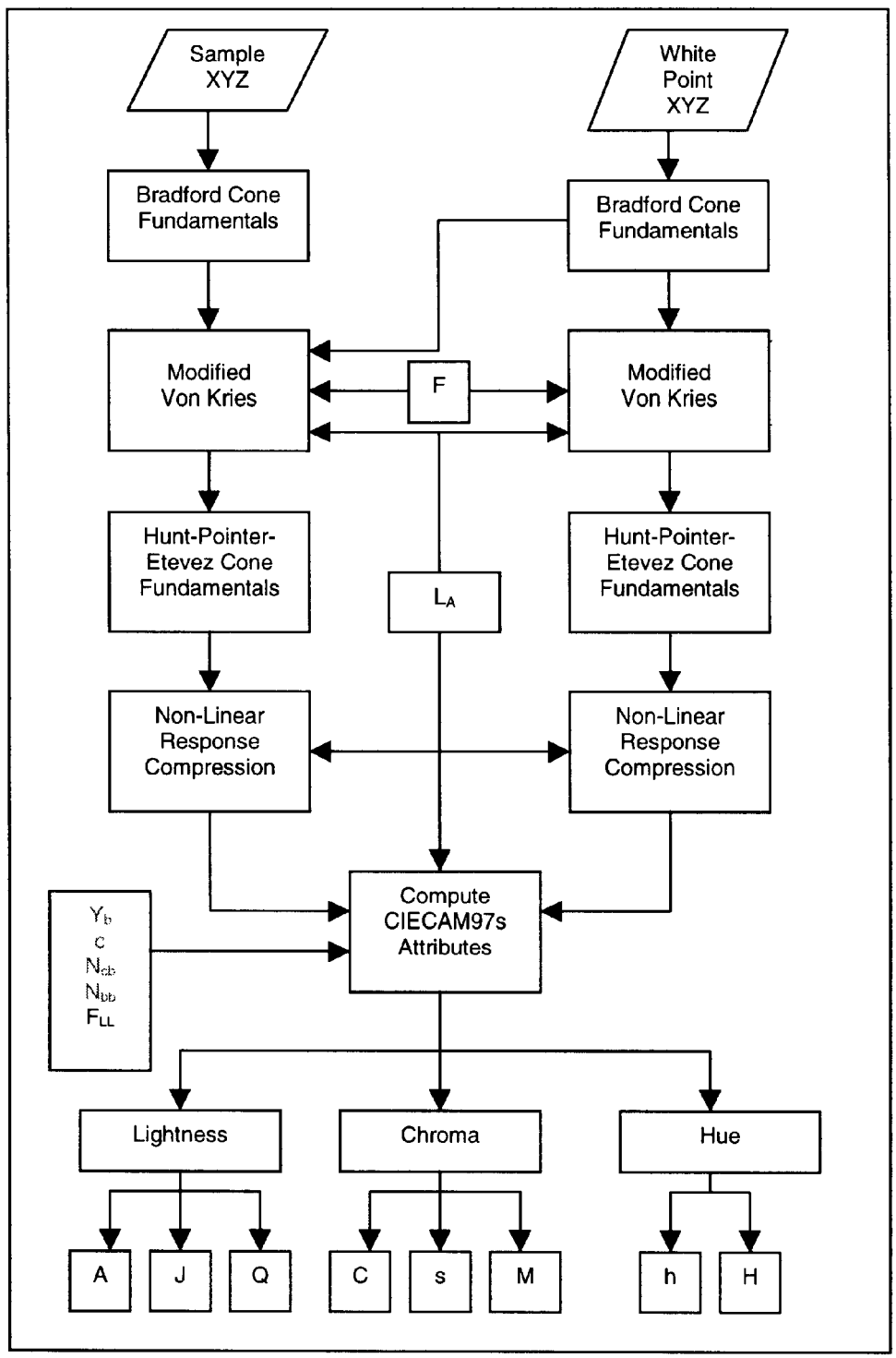
FIG. 1 illustrates a prior art method of converting an image into the CIECAM97s perceptual color space.

Thus far, a method and apparatus is described in which a single mask is derived for performing pixel-by-pixel luminance adjustments when converting to a perceptual color space representation that is a function of a background luminance parameter. In this embodiment, the lightness attribute (J) is primarily affected by the background luminance adjustments. A variation of this embodiment is the adjustment of any of the perceptual attributes of a perceptual color space representation of an image. For instance, in the case of the CIECAM97s color space representation each of the lightness, chroma, and hue (FIG. 1) perceptual attributes can also be masked when converting to a perceptual color space representation and hence adjusted. In this embodiment, a mask can be derived in the same manner as for the luminance adjustment mask for any combination of the lightness, chroma, and/or hue attributes. Consequently, at least one mask is derived, however a maximum of three different masks can be derived—one per perceptual attribute.

In the preceding description, numerous specific details are set forth, such as specific color space representations and conversion equations in order to provide a through understanding of the present invention. It will be apparent, however, to one skilled in the art that these specific details need not be employed to practice the present invention. In other instances, well-known digital image processing steps have not been described in detail in order to avoid unnecessarily obscuring the present invention.

In addition, although element of the present invention have been described in conjunction with a certain embodiment, it is appreciated that the invention can be implement in a variety of other ways. Consequently, it is to be understood that the particular embodiment shown and described by way of illustration is in no way intended to be considered limiting. Reference to the details of this embodiment is not intended to limit the scope of the claims which themselves recited only those features regarded as essential to the invention.

We claim:

1. A method of color correcting an image having an associated pixel representation comprising the steps of:
   deriving a mask having associated mask values from the pixel representation;
   converting the pixel representation into a color space representation which is a function of a background luminance parameter, said background luminance parameter being a viewing condition parameter; and
   while converting, using the mask values as the background luminance parameter so as to provide local pixel-by-pixel luminance adjustment of the image in the color space representation.

2. The method of image correction as described in claim 1 wherein the color space representation is a perceptual color space representation.

3. The method of color correction as described in claim 1 wherein the color space representation is one of CIECAM97s and CAM97s2.

4. The method of color correction as described in claim 1 wherein the pixel representation is one of a tristimulus, RGB color space, and CMYK color space representation of the image.

5. The method of color correction as described in claim 1 wherein the step of deriving the mask comprises the steps of:
   decimating the pixel representation to generate a condensed pixel representation of the image, the condensed representation having an associate condensed set of values less in number than the associated mask values;
   filtering the condensed representation by averaging the condensed values to generate a filtered condensed representation;
   expanding the filtered condensed representation to generate an expanded representation having an associated expanded set of values that are equal in number to the associated mask values;
   scaling the expanded representation to generate the mask.

6. The method of color correction as described in claim 1 wherein the step of deriving the mask further comprises the steps of:
   deriving for each given pixel value in the pixel representation a corresponding mask value b determining an average pixel value of a set of pixel values surrounding the given pixel value; and
   using the averaged value as the corresponding mask value.

7. The method as described in claim 6 wherein the step of averaging is a weighted averaging.

8. A system of color correction of an image having an associated pixel representation comprising:
   a first digital image processor for deriving a mask of digital values from the pixel representation;
   a second digital image processor for converting the pixel representation to a color space representation which is a function of a background luminance parameter, said background luminance parameter being a viewing condition parameter, wherein the second digital image processor uses the mask values as the background luminance parameter to convert the pixel representation to the color space representation.

9. The system as described in claim 8 wherein the first digital image processor comprises an image filter for receiving the pixel representation and generating averaged representation of the image.

10. The system as described in claim 9 wherein the first digital image processor comprises an image decimator for decimating the pixel representation of the image into a condensed representation of the image prior to providing it to the image filter.

11. The system as described in claim 10 wherein the filter generates a weighted averaged representation.

12. The system as described in claim 11 wherein the first digital image processor comprises an image expander for expanding the condensed and filtered image to generate an expanded representation of the condensed and averaged representation.

13. The system as described in claim 8 being implemented using one of a digital signal processing implementation, hardware implementation, and a combination of digital signal processing and hardware implementations.

14. A method of color correcting an image having an associated pixel representation comprising the steps of:
   deriving at least one mask having associated mask values from the pixel representation;
   converting the pixel representation into a color space representation which is represented by viewing condition perceptual attributes, each mask corresponding to one of the viewing condition perceptual attributes; and
   while converting, using the mask values to provide pixel-by-pixel adjustments of at least one of the viewing condition perceptual attributes of the image in the color space representation.

15. The method as described in claim 14 wherein the color space representation is one of CEICAM97s and CAM97s2 and the perceptual attributes include luminance, chroma, and hue.

16. The method as described in claim 14 wherein the viewing condition perceptual attributes comprise background luminance.

* * * * *